United States Patent [19]
Denzinger et al.

[11] Patent Number: 6,048,945
[45] Date of Patent: Apr. 11, 2000

[54] GRAFT POLYMERS COMPRISING POLYMERS, CONTAINING ALKYLENE OXIDE UNITS, AND ETHYLENICALLY UNSATURATED COMPOUNDS, THEIR PREPARATION AND THEIR USE

[75] Inventors: Walter Denzinger, Speyer; Martin Rübenacker, Altrip; Claudia Nilz, Rödersheim-Gronau; Primoz Lorencak, Ludwigshafen; Dietmar Mönch, Weinheim; Rudolf Schuhmacher, Böhl-Iggelheim; Andreas Stange, Mannheim, all of Germany

[73] Assignee: BASF Aktiengesellschaft, Ludwigshafen, Germany

[21] Appl. No.: 08/945,546
[22] PCT Filed: Apr. 20, 1996
[86] PCT No.: PCT/EP96/01663
  § 371 Date: Nov. 3, 1997
  § 102(e) Date: Nov. 3, 1997
[87] PCT Pub. No.: WO96/34903
  PCT Pub. Date: Nov. 7, 1996

[30] Foreign Application Priority Data

May 2, 1995 [DE] Germany .......................... 195 15 943

[51] Int. Cl.$^7$ .......................... C08F 283/06; D21H 17/00; D21H 17/33; D21H 17/46
[52] U.S. Cl. .......................... 525/403; 525/409; 525/534; 525/540
[58] Field of Search .................................. 525/403, 409, 525/534, 540

[56] References Cited

U.S. PATENT DOCUMENTS

| | | |
|---|---|---|
| 4,880,497 | 11/1989 | Pfohl et al. . |
| 4,975,524 | 12/1990 | Berendt .................... 528/366 |
| 4,978,427 | 12/1990 | Pfohl et al. . |
| 5,002,587 | 3/1991 | Berendt . |
| 5,089,570 | 2/1992 | Rauterkus et al. ................ 525/455 |
| 5,334,287 | 8/1994 | Hartmann et al. ................ 162/175 |

FOREIGN PATENT DOCUMENTS 0 363 319   4/1990   European Pat. Off. .

OTHER PUBLICATIONS

Fieser, Organic Chemistry, third edition p. 399 and 401, publication date unavailable.
Institut fuer Textilchemie, CAP/US An 1992:492196, abstracting DE 4030358 A1, 1992.

*Primary Examiner*—Jeffrey C. Mullis
*Attorney, Agent, or Firm*—Oblon, Spivak, McClelland, Maier & Neustadt, P.C.

[57] ABSTRACT

A graft polymer obtained by free radically polymerizing:
  (A) a monomer or monomer mixture comprising:
   (a) from 10–100% by weight of a N-vinylcarboxamide of the formula:

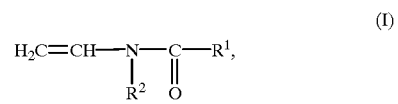

where $R^1$ and $R^2$ are each H or $C_1$–$C_6$-alkyl,
   (b) from 0–90% by weight of at least one other monoethylenically unsaturated monomer which is copolymerizable with (a), and
   (c) from 0–5% by weight of at least one monomer having at least two ethylenically unsaturated non-conjugated double bonds in the molecule, in the presence of
  (B) a polytetrahydrofuran or a polymer which contains at least 3 units of a $C_2$–$C_4$ alkylene oxide and is a homopolymer of $C_{2-4}$-alkylene oxide having two free terminal OH groups or random or block copolymers of $C_{2-4}$-alkylene oxides having two free terminal OH groups or the reaction products of $C_{2-4}$-alkylene oxides with phenols, amines or fatty carboxylic acids, in a weight ratio (A):(B) ranging from 95:5 to 10:80, some or all of the amide groups having been eliminated by hydrolysis.

10 Claims, No Drawings

GRAFT POLYMERS COMPRISING POLYMERS, CONTAINING ALKYLENE OXIDE UNITS, AND ETHYLENICALLY UNSATURATED COMPOUNDS, THEIR PREPARATION AND THEIR USE

BACKGROUND OF THE INVENTION

1. Field of the Invention

The present invention relates to graft polymers comprising polymers, containing alkylene oxide units, and open-chain N-vinylcarboxamides, processes for their preparation and the use of the graft polymers in the production of paper, board and cardboard, as dispersants for pigments and as starch cationizing agents.

2. Description of the Background

U.S. Pat. Nos. 4,880,497 and 4,978,427 each disclose the production of paper having high dry strength and wet strength, a hydrolyzed copolymer which is obtainable by copolymerization of N-vinylformamide and ethylenically unsaturated monomers, for example vinyl acetate, vinyl propionate or an alkyl vinyl ether, and hydrolysis of from 30 to 100 mol % of the formyl groups of the copolymer with formation of amino groups being used as a strength agent either on the surface of the paper or in the paper stock prior to sheet formation. The hydrolyzed copolymers are used in amounts of from 0.1 to 5% by weight, based on dry fibers.

EP-A-0 363 319 discloses graft polymers which are obtainable by free radical polymerization of unsubstituted or N-substituted acrylamide or methacrylamide and N-vinyl-substituted amides or vinyl esters of a saturated aliphatic monocarboxylic acid in the presence of adducts of alkylene oxides with a trihydric or polyhydric aliphatic alcohol of 3 to 10 carbon atoms. The graft polymers are used as dyeing assistants for coloring cellulose fibers with substantive dyes or reactive dyes.

U.S. Pat. No. 5,334,287 discloses graft polymers which are obtainable by free radical polymerization of N-vinylcarboxamides, preferably N-vinylformamide, and, if required, other monomers in the presence of monosaccharides, oligosaccharides, polysaccharides or derivatives of each of these and, if required, hydrolysis of the polymerized N-vinylcarboxamide group with formation of vinylamine units.

The graft polymers are used as dry strength and wet strength agents in the production of paper, board and cardboard.

SUMMARY OF THE INVENTION

It is an object of the present invention to provide novel substances. It is a further object of the present invention to provide process assistants for the production of paper, board and cardboard.

We have found that these objects are achieved, according to the invention, by graft polymers comprising polymers, containing alkylene oxide units, and ethylenically unsaturated compounds, wherein the graft polymers are obtainable by free radical polymerization of (A) monomers or monomer mixtures comprising
  (a) from 10 to 100% by weight of N-vinylcarboxamides of the formula

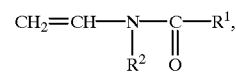
(I)

where $R^1$ and $R^2$ are each H or $C_1$-$C_6$-alkyl,
  (b) from 0 to 90% by weight of other monoethylenically unsaturated monomers copolymerizable with the monomers (a) and
  (c) from 0 to 5% by weight of monomers having at least two ethylenically unsaturated, nonconjugated double bonds in the molecule in the presence of (B) polymers which contain at least 3 units of a $C_2$-$C_4$-alkylene oxide, and/or polytetrahydrofurans, in a weight ratio (A):(B) of (95 to 10):(5 to 80), and, if required, subsequent elimination of the group

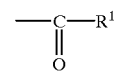

from the polymerized monomers (a) of the graft polymer with formation of units of the formula

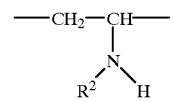

The present invention furthermore relates to a process for the preparation of graft polymers comprising polymers, containing alkylene oxide units, and ethylenically unsaturated compounds, wherein (A) monomers or monomer mixtures comprising
  (a) from 10 to 100% by weight of N-vinylcarboxamides of the formula

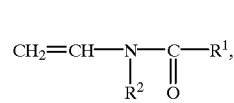
(I)

where $R^1$ and $R^2$ are each H or $C_1$-$C_6$-alkyl,
  (b) from 0 to 90% by weight of other, carboxyl-free monoethylenically unsaturated monomers copolymerizable with the monomers (a) and
  (c) from 0 to 5% by weight of monomers having at least two ethylenically unsaturated, nonconjugated double bonds in the molecule are subjected to free radical polymerization in the presence of (B) polymers which contain at least 3 units of a $C_2$-$C_4$-alkylene oxide, and/or polytetrahydrofurans, in a weight ratio (A):(B) of (95 to 20):(5 to 90), and some or all of the groups

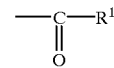

are then eliminated from the polymerized monomers (a) of the graft polymer with formation of units of the formula

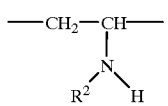

DETAILED DESCRIPTION OF THE INVENTION

A preferably used monomer (A) is N-vinylformamide. In a further process step, from 2 to 100%, preferably from 30 to 95% of the formyl groups of the polymerized N-vinylformamide are eliminated from the graft polymers thus obtainable, with formation of units of the formula

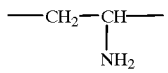

Preferably used monomer mixtures consist of from 1 to 99% by weight of N-vinylformamide and from 99 to 1% by weight of vinyl formate, vinyl acetate, vinyl propionate, acrylonitrile, N-vinylpyrrolidone, N-vinylcaprolactam, acrylic acid or mixtures of the stated monomers. From 1 to 100%, preferably from 30 to 95% of the formyl groups of the polymerized N-vinylformamide are eliminated from the graft polymers thus obtainable. Depending on the hydrolysis conditions, the polymerized comonomers may also be chemically modified, for example vinyl alcohol units are formed from the polymerized vinyl esters. The hydrolyzed graft polymers thus obtainable are used as dry strength and wet strength agents for paper, board and cardboard.

Suitable monomers for the preparation of the graft polymers are N-vinylcarboxamides of the formula

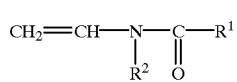

(I)

where $R^1$ and $R^2$ may be identical or different and are each hydrogen or $C_1$–$C_6$-alkyl. Suitable monomers are, for example, N-vinylformamide ($R^1$=$R^2$=H in the formula I), N-vinyl-N-methylformamide, N-vinylacetamide, N-vinyl-N-methylacetamide, N-vinyl-N-ethylacetamide, N-vinyl-N-methylpropionamide and N-vinylpropionamide. For the preparation of the graft polymers, the stated monomers can be used either alone or as a mixture with one another. From this group of monomers, N-vinylformamide is preferably used.

The above mentioned N-vinylcarboxamides can, if required, be used in the graft polymerization together with other monoethylenically unsaturated monomers copolymerizable therewith. Suitable monomers of group (b) are, for example, vinyl esters of saturated carboxylic acids of 1 to 6 carbon atoms, eg. vinyl formate, vinyl acetate, vinyl propionate and vinyl butyrate. The esters, amides and nitriles of monoethylenically unsaturated $C_3$–$C_6$-carboxylic acids are also suitable. Examples of suitable amides are acrylamide, methacrylamide and N-alkylmono- and N-alkyldiamides having alkyl radicals of 1 to 6 carbon atoms, eg. N-methylacrylamide, N,N-dimethylacrylamide, N-methylmethacrylamide, N-ethylacrylamide, N-propylacrylamide and tert-butylacrylamide and the basic (meth)acrylamides thereof, such as dimethylaminoethylacrylamide, dimethylaminoethylmethacrylamide, diethylaminoethylacrylamide, diethylaminoethyl-methacrylamide, dimethylaminopropylacrylamide, diethyl-aminopropylacrylamide, dimethylaminopropylmethacrylamide and diethylaminopropylmethacrylamide. The esters of the monoethylenically unsaturated carboxylic acids with $C_1$–$C_6$-alcohols, eg. methyl acrylate, methyl methacrylate, ethyl acrylate and ethyl methacrylate, or with glycols or polyglycols, where in each case only one OH group of the glycols and polyglycols is esterified with an ethylenically unsaturated carboxylic acid, eg. hydroxyethyl acrylate, hydroxyethyl methacrylate, hydroxypropyl acrylates, hydroxybutyl acrylates, hydroxypropyl methacrylates, hydroxybutyl methacrylates and the monoesters of acrylic acid with polyalkylene glycols having a molecular weight of from 1500 to 10,000, are also suitable. The esters of ethylenically unsaturated carboxylic acids with amino alcohols, eg. dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate, diethylaminopropyl acrylate, diethylaminopropyl methacrylate, dimethylaminobutyl acrylate, diethylaminobutyl acrylate, dimethylaminopentyl acrylate, dimethylaminoneopentyl methacrylate and dimethylaminohexyl acrylate, are also useful. The basic acrylates and acrylamides are used in the form of the free bases, of the salts with mineral acids, eg. hydrochloric acid, sulfuric acid and nitric acid, or in quaternized form. Suitable quaternizing agents are, for example, dimethyl sulfate, methyl chloride, ethyl chloride, benzyl chloride and diethyl sulfate. Monoethylenically unsaturated mono and dicarboxylic acids or anhydrides of 3 to 6 carbon atoms, such as acrylic acid, methacrylic acid, crotonic acid, maleic acid, maleic anhydride, fumaric acid, itaconic acid, itaconic anhydride, citraconic acid and citraconic anhydride, are also suitable.

Other suitable monomers of group (b) are N-vinylpyrrolidone, N-vinylcaprolactam, acrylonitrile, methacrylonitrile, N-vinylimidazole and substituted N-vinylimidazoles, such as N-vinyl-2-methylimidazole, N-vinyl-4-methylimidazole, N-vinyl-5-methylimidazole, N-vinyl-2-ethylimidazole and N-vinylimidazolines, eg. N-vinylimidazoline, N-vinyl-2-methylimidazoline and N-vinyl-2-ethylimidazoline. Apart from being used in the form of the free bases, N-vinylimidazoles and N-vinylimidazolines are also used in a form neutralized with mineral acids or in quaternized form, quaternization preferably being effected with dimethyl sulfate, diethyl sulfate, benzyl chloride, methyl chloride or ethyl chloride.

Sulfo-containing monomers, for example vinylsulfonic acid, allylsulfonic acid, methallylsulfonic acid, styrenesulfonic acid, 3-sulfopropyl acrylate, 3-sulfopropyl methacrylate and 2-acrylamido-2-methylpropanesulfonic acid, are also suitable as monomers (b). The compounds having acid groups may be used in the form of the free acids or of the ammonium, alkali metal and alkaline earth metal salts in the graft polymerization.

Among the monomers (b), vinyl formate, vinyl acetate, vinyl propionate, acrylonitrile, N-vinylpyrrolidone, N-vinylcaprolactam and acrylic acid are preferred.

In the preparation of the graft polymers, monomer mixtures comprising from 10 to 100% by weight of at least one monomer of group (a) and from 0 to 90% by weight of at least one monomer of group (b) are used.

The graft copolymers can be modified by copolymerizing the monomers (a) or monomer mixtures (a) and (b) with up to 5% by weight of a monomer (c) having at least two ethylenically unsaturated nonconjugated double bonds in the molecule, in the presence of the compounds (B). The compounds (c) are usually used as crosslinking agents in copolymerizations. They may be added to the monomer mixtures comprising (a) and, if required (b) which are used for the copolymerization. Where they are employed, the preferably used amount is from 0.05 to 2% by weight. The presence of the monomers of group (c) during the copolymerization results in an increase in the K values of the copolymers. Suitable compounds of this type are, for example, methylenebisacrylamide, esters of acrylic acid and methacrylic acid with polyhydric alcohols, eg. glycol diacrylate, glyceryl triacrylate, glycol dimethacrylate and glyceryl trimethacrylate, and polyols, such as pentaerythritol and glucose, which are diesterified or polyesterified with acrylic acid or methacrylic acid. Other suitable crosslinking agents are divinylbenzene, divinyl dioxane, pentaerythrityl triallyl ether and pentaallylsucrose. Water-soluble monomers, such as glycol diacrylate or glycol diacrylates of polyethylene glycols having a molecular weight of up to 3000, are preferably used from this group of compounds.

The polymerization of the monomers (a) and that of the monomers (a) and (b) and, if required, in each case additionally (c) is carried out, according to the invention, in the presence of polymers containing alkylene oxide units. Such products are polyalkylene oxides having at least 3 alkylene oxide units or polytetrahydrofurans consisting of at least 3 units.

Polymers containing alkylene oxide units and polytetrahydrofurans are known. Of particular interest are the home and copolymers of $C_2$–$C_4$-alkylene oxides. They are prepared, for example, by homo- or copolymerization of ethylene oxide, propylene oxide, n-butylene oxide and/or isobutylene oxide. The copolymers may be either random copolymers, when mixtures of at least two alkylene oxides are polymerized, or block copolymers, when first an alkylene oxide, for example ethylene oxide, and then another alkylene oxide, eg. propylene oxide, are polymerized. The block copolymers may be assigned, for example, to the type AB, ABA or BAB, where A is, for example, a polyethylene oxide block and B is a block comprising polypropylene oxide. These copolymers can, if required, also contain n-butylene oxide and/or isobutylene oxide as polymerized units. The polyethylene oxides contain at least 3 alkylene oxide units in the molecule. The polyalkylene oxides may contain, for example, up to 50,000 alkylene oxide units in the molecule. Preferred polyalkylene oxides are those which have from 3 to 1000 alkylene oxide units in the molecule. The polytetrahydrofurans contain, for example, from 3 to 200, preferably from 3 to 100, tetramethylene oxide units.

Preferably used compounds are homopolymers or block copolymers of ethylene oxide and propylene oxide and random copolymers of ethylene oxide and propylene oxide, which are obtainable by copolymerization of a mixed gas comprising ethylene oxide and propylene oxide. For the purpose of the present invention, polymers containing alkylene oxide units are also to be understood as meaning adducts of $C_2$–$C_4$-alkylene oxides with alcohols, phenols, carboxylic acids and amines.

Alcohols which are suitable for the reaction of the alkylene oxides are of, for example, 1 to 30 carbon atoms, eg. methanol, ethanol, n-propanol, isopropanol, n-butanol, n-octanol, 2-ethylhexanol, decanol, dodecanol, palmityl alcohol, cetyl alcohol and stearyl alcohol. Of particular industrial interest are the alcohols obtainable by the oxo process, for example $c_{10}$-alcohols, $c_{13}$ oxo alcohols or natural alcohols, such as $C_{10}/C_{18}$ tallow fatty alcohols.

In addition to the stated monohydric alcohols, it is of course also possible to use dihydric and polyhydric alcohols, eg. glycol, glycerol, erythritol, pentaerythritol and sorbitol. The alcohols are reacted in a molar ratio of from 1:3 to 1:200 with at least one $C_2$–$C_4$-alkylene oxide.

Further suitable polymers containing alkylene oxide units are reaction products of fatty acids with alkylene oxides.

Particularly suitable fatty acids are those containing 8 to 10 carbon atoms in the molecule, for example lauric acid, myristic acid, stearic acid, palmitic acid, coconut fatty acid, tallow fatty acid and oleic acid.

For the purposes of the present invention, polymers containing ethylene oxide units are furthermore adducts of $C_2$–$C_4$-alkylene oxides with $C_1$–$C_{12}$-alkylphenols, such as n-decylphenol, n-octylphenol, isobutylphenol and methylphenol. Other suitable components (B) for the preparation of the graft polymers are the adducts of $C_2$–$C_4$-alkylene oxides with secondary $C_2$–$C_{30}$-amines, such as di-n-butylamine, di-n-octylamine, dimethylamine and Distearylamine. The molar ratio of amine to at least one alkylene oxide is from 1:3 to 1:200, preferably from 1:3 to 1:100. In the case of the adducts of alkylene oxides with alcohols, phenols, acids or amines, the alkylene oxides in the form of a mixed gas can be subjected to the addition reaction with the above mentioned compounds, or the reaction is carried out first with ethylene oxide and then with propylene oxide. It is also possible to subject first propylene oxide and then ethylene oxide to the addition reaction with the stated compounds. Apart from ethylene oxide and propylene oxide, it is possible in each case also to subject isobutylene oxide and/or n-butylene oxide to the addition reaction. The successive addition of the alkylene oxides results in the formation of block copolymers. In some cases, it may also be advantageous to block the free OH groups of the alkoxylation products with a terminal group. Blocking with a terminal group may be effected, for example, by means of an alkyl radical with formation of an ether group. For example, the alkoxylation products can be reacted with alkylating agents, such as dimethyl sulfate. The terminal OH groups can, if required, also be esterified by reaction with carboxylic acids, for example acetic acid or stearic acid.

For the preparation of the graft polymers, the monomers (a), mixtures of (a) and (b) and, if required, in each case additionally (c) are subjected to free radical polymerization in the presence of compounds of component (B). In some cases, it may be advantageous for the action of the resulting polymer to use two or more of the compounds stated under (B). The graft polymerization can be carried out in the presence or absence or inert solvents or inert diluents. Since the polymerization in the absence of inert solvents or diluents generally leads to nonuniform polymers, the polymerization in an inert solvent or diluent is preferred. Examples of suitable inert diluents are those in which the compounds stated under (B) can be suspended and those which dissolve the monomers (A). In these cases, the polymers are present in suspended form after the copolymerization and can readily be isolated in solid form by filtration. Suitable inert diluents are, for example, toluene, o-, m- and p-xylene and isomer mixtures, ethylbenzene, aliphatic hydrocarbons, such as pentane, hexane, heptane, octane, nonane, dodecane, cyclohexane, cyclooctane, methylcyclohexane and mixtures of the stated hydrocarbons, and gasoline fractions which contain no polymerizable monomers. Chlorohydrocarbons, such as chloroform, carbon tetrachloride, hexachloroethane, dichloroethane and tetrachloroethane, are also suitable. In the procedure described above, in which the compounds of component (B) are suspended in an inert diluent, anhydrous compounds of component (B) are preferably used.

A preferred method for the preparation of the polymers is solution polymerization, the compounds of component (B), the monomers (A) and the resulting polymer being present in at least dispersed, preferably dissolved, form. For example, inert solvents, such as methanol, ethanol, isopropanol, n-propanol, n-butanol, sec-butanol, tetrahydrofuran, dioxane and water, and mixtures of the stated inert solvents are suitable for the solution polymerization. The polymerization can be carried out continuously or batchwise.

The graft polymers are generally prepared with the concomitant use of free radical initiators.

Preferred free radical initiators are all those which have a half-life of less than 3 hours at the particular polymerization temperature chosen. If the polymerization is first initiated at a lower temperature and completed at a higher temperature, it is advantageous to use at least two initiators which decompose at different temperatures, ie. first to use an initiator which decomposes at the lower temperature for initiating the polymerization and then to complete the main polymerization with an initiator which decomposes at the higher temperature. Water-soluble and water-insoluble initiators or mixtures of water-soluble and water-insoluble initiators may be used. The water-insoluble initiators are then soluble in the organic phase. For example, the initiators listed below can be used for the temperature ranges stated below.

Temperature: from 40 to 60° C.:

Acetylcyclohexanesulfonyl peroxide, diacetyl peroxydicarbonate, dicyclohexyl peroxydicarbonate, di-2-ethylhexyl peroxydicarbonate, tert-butyl perneodecanoate, 2,2'-azobis-(4-methoxy-2,4-dimethylvaleronitrile), 2,2'-azobis(2-methyl-N-phenylpropionamidine) dihydrochloride, 2,2'-azobis-(2-methylpropionamidine) dihydrochloride.

Temperature: from 60 to 80° C.:

tert-butyl perpivalate, dioctanoyl peroxide, dilauroyl peroxide, 2,2'-azobis(2,4-dimethylvaleronitrile).

Temperature: from 80 to 100° C.:

dibenzoyl peroxide, tert-butyl per-2-ethylhexanoate, tert-butyl permaleate, 2,2'-azobisisobutyronitrile, dimethyl 2,2'-azobisisobutyrate, sodium persulfate, potassium persulfate, ammonium persulfate.

Temperature: from 100 to 120° C.:

bis(tert-butylperoxy)cyclohexane, tert-butyl peroxyisopropylcarbonate, tert-butyl peracetate, hydrogen peroxide.

Temperature: from 120 to 140° C.:

2,2-bis(tert-butylperoxy)butane, dicumyl peroxide, di-tert-amyl peroxide, di-tert-butyl peroxide.

Temperature: >140° C.

p-menthane hydroperoxide, pinane hydroperoxide, cumyl hydroperoxide and tert-butyl hydroperoxide.

If, in addition to the stated initiators, salts or complexes of heavy metals, for example copper, cobalt, manganese, iron, vanadium, nickel and chromium salts, or organic compounds, such as benzoin, dimethylaniline or ascorbic acid, are also used, the half-lives of the stated free radical initiators may be reduced. For example, tert-butyl hydroperoxide can be activated with the addition of only 5 ppm of copper(II) acetylacetonate so that polymerization can be carried out at as low as 100° C. The reducing component of redox catalysts may also be, for example, compounds such as sodium sulfite, sodium bisulfite, sodium formaldehyde sulfoxylate and hydrazine. From 0.01 to 20, preferably from 0.05 to 10, % by weight, based on the monomers used in the polymerization, of a polymerization initiator or of a mixture of a plurality of polymerization initiators are used. From 0.01 to 15% of the reducing compounds are used as redox components. Heavy metals are used in an amount of from 0.1 to 100 ppm, preferably from 0.5 to 10 ppm. It is often advantageous to use a combination of peroxide, reducing agent and heavy metal as the redox catalyst.

The polymerization of the essential monomers (a) and of (b), which may be usedhich may be used, and of the monomers (c) which may be present can also be carried out by the action of ultraviolet radiation, in the presence or absence of UV initiators. The conventional photoinitiators or sensitizers are used for the polymerization under the action of UV radiation. These are, for example, compounds such as benzoin, benzoin ethers, α-methylbenzoin or α-phenylbenzoin. Triplet sensitizers, such as benzil diketals, may also be used. For example, in addition to high-energy UV lamps, such as carbon arc lamps, mercury vapor lamps or xenon lamps, low-UV light sources, such as fluorescent tubes having a high blue content, may be used as UV radiation sources.

In order to prepare polymers having a low K value, the polymerization is advantageously carried out in the presence of regulators. Examples of suitable regulators are organic compounds containing sulfur in bonded form. These include, for example, mercapto compounds, such as mercaptoethanol, mercaptopropanol, mercaptobutanol, mercaptoacetic acid, mercaptopropionic acid, butyl mercaptan and dodecyl mercaptan. Other suitable regulators are allyl compounds, such as allyl alcohol, aldehydes, such as formaldehyde, acetaldehyde, propionaldehyde, n-butyraldehyde and isobutyraldehyde, formic acid, ammonium formate, propionic acid, hydrazine sulfate and butenols. If the polymerization is carried out in the presence of regulators, from 0.05 to 20% by weight, based on the monomers used in the polymerization, of said regulators are required.

The graft polymerization of the components (A) and (B) is usually carried out in an inert gas atmosphere in the absence of atmospheric oxygen. During the polymerization, thorough mixing of the reactants is generally ensured. In the case of relatively small batches where reliable removal of the heat of polymerization is ensured, the reactants, which are preferably present in an inert diluent, can be subjected to batchwise copolymerization by heating the reaction mixture to the polymerization temperature and then allowing the reaction to proceed. These temperatures are from 40 to 180° C. In order to be able to control the course of the polymerization reaction more readily, the monomers (A) are added continuously or batchwise to the polymerizing mixture at the desired polymerization temperature at a rate such that the polymerization is readily controllable in the desired temperature range. A preferred method of addition of the monomers of component (A) is that where the compounds of component (B) or at least a part of the compounds of component (B) are or is initially taken in the polymerization reactor and heated therein to the desired polymerization temperature while stirring. As soon as this temperature is reached, the monomers (a) and, if required, (b) and, if required, (c) and the initiator and, if required, a regulator are added over a period of from about 1 to 10, preferably from 2 to 8, hours. Such a procedure is used, for example, in the polymerization of components (A) and (B) in an inert diluent in which the component (B) is suspended, and also in the polymerization carried out in solution.

The novel graft polymers are preferably prepared by suspension or solution polymerization of the components (A) and (B) in an aqueous medium, solution polymerization in water being particularly preferred. In solution polymerization in an aqueous medium, for example, at least a part of the compounds of components (A) and (B) is initially taken in an aqueous medium and the monomers (a and, if required, b) and, if required, the monomers (c) are added continuously or batchwise to the polymerizing reaction mixture. In order to avoid hydrolysis of the monomeric N-vinylcarboxamides during the polymerization in aqueous solution, the polymerization is preferably carried out at a pH of from 4 to 9, in particular from 5 to 8. In many cases, it is advisable to carry out the reaction additionally in the presence of buffers, for example to add primary or secondary sodium phosphate to the aqueous phase. Where monomers (b) containing acid groups are used, they are employed in the form of the salts.

In the graft polymerization, the temperatures are usually from 40 to 180° C., preferably from 50 to 150° C., in particular from 60 to 110° C. As soon as the temperature in the graft polymerization is above the boiling points of the inert diluent or solvent or of the monomers, the polymerization is carried out under superatmospheric pressure. The concentration of components (A) and (B) in the graft polymerization in the presence of inert solvents or inert diluents is from 10 to 80, preferably from 20 to 70, % by weight. The preparation of the graft polymers can be carried out in the conventional polymerization apparatuses. For example, stirred kettles which are equipped with anchor, paddle or impeller stirrers or multistage impulse countercurrent agitators are used for this purpose. Particularly in the polymerization in the absence of diluents, it may advantageous to carry out the polymerization in a kneader. It may also be necessary to carry out the polymerization in a kneader when high concentrations are used.

Graft polymers which, where they are soluble in water, have K values of from 8 to 250, preferably from 10 to 150 (measured in 1% strength aqueous solutions of the copolymers at pH 7 and 25° C.) are obtained. The graft polymers which can be prepared by the above mentioned processes are colorless to brownish products. In the case of polymerization in an aqueous medium, they are present as emulsions or polymer solutions. Depending on the particular composition of the graft polymers, low-viscosity to pasty aqueous solutions or aqueous emulsions are obtained.

The preparation of the graft polymers is followed by a second process stage in which hydrolysis is carried out under the action of acids, bases or enzymes. The polymers contain at least 10% by weight of units of the formula

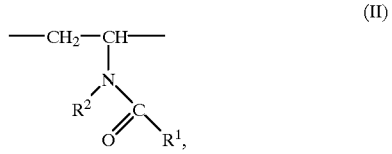

(II)

where $R^1$ and $R^2$ are each H or $C_1$–$C_6$-alkyl. The units II are converted by hydrolysis into units of the formula

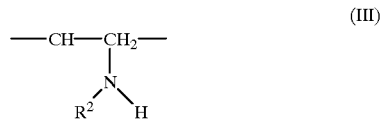

(III)

where $R^2$ is H or $C_1$–$C_6$-alkyl. Here, units of the formula

(IV)

where $R^1$ has the meaning stated in the formula II, are eliminated from the polymerize monomers (a) of the graft polymer. Depending on the reaction conditions in the hydrolysis, ie. on the amount of acid or base, based on the polymer to be hydrolyzed, and on the reaction temperature in the hydrolysis, either partial or complete hydrolysis of the units of the formula (II) is obtained. The hydrolysis of the graft polymers is continued until from 2 to 100%, preferably from 30 to 95%, of the monomer units of the formula (II) which are present in the graft polymers have been hydrolyzed. For the hydrolysis, at least one acid or base is added to the graft polymers prepared in the first process stage. Suitable acids are, for example, mineral acids, such as a hydrohalic acid (gaseous or in aqueous solution), sulfuric acid, nitric acid or phosphoric acid (ortho-phosphoric, meta-phosphoric or polyphosphoric acid), and organic acids, for example $C_1$–$C_5$-carboxylic acids, such as formic acid, acetic acid and propionic acid, or the aliphatic or aromatic sulfonic acids, such as methanesulfonic acid, benzenesulfonic acid or toluenesulfonic acid. Hydrochloric acid or sulfuric acid is preferably used for the hydrolysis. In the hydrolysis with acids, the pH is from 0 to 5. For example, from 0.05 to 1.5, preferably from 0.4 to 1.2, equivalents of acid are required per equivalent of formyl groups in the polymer.

In the hydrolysis with bases, it is possible to use hydroxides of metals of the first and second main groups of the Periodic Table, for example lithium hydroxide, sodium hydroxide, potassium hydroxide, calcium hydroxide, strontium hydroxide and barium hydroxide being suitable. However, ammonia and alkyl derivatives of ammonia may also be used, for example alkylamines or arylamines, eg. triethylamine, monoethanolamine, diethanolamine, triethanolamine, morpholine or aniline. In the hydrolysis with bases, the pH is from 8 to 14. The bases may be used in the solid, liquid or, if required, also gaseous state, diluted or undiluted. Bases preferably used for the hydrolysis are ammonia, sodium hydroxide solution and potassium hydroxide solution. The hydrolysis at acidic or alkaline pH is carried out, for example, at from 30 to 170° C., preferably from 50 to 120° C. It is complete after from about 2 to 8, preferably from 3 to 5, hours. After these reaction times, the resulting degrees of hydrolysis of the units of the formula (II) in the polymer are from 1 to 100%. A procedure in which the hydrolysis is carried out by adding the bases or acids in aqueous solution has proven particularly useful. After the hydrolysis, neutralization is generally effected so that the pH of the hydrolyzed polymer solution is from 2 to 8, preferably from 3 to 7. Neutralization is required when it is intended to avoid or delay continuation of the hydrolysis of partially hydrolyzed polymers. The hydrolysis may also be carried out with the aid of enzymes.

Particularly preferred graft polymers are those which are prepared using, as monomer (A), N-vinylformamide or a monomer mixture comprising (a) from 1 to 99% by weight of N-vinylformamide and
(b) from 99 to 1% by weight of vinyl formate and/or vinyl acetate and which are then subjected to hydrolysis in which from 1 to 100% of the formyl groups of the polymerized N-vinylformamide are eliminated from the graft polymer with formation of units of the formula III where $R^2$ is H. In the acidic hydrolysis of graft polymers which, in addition to N-vinylformamide, also contain acrylonitrile as polymerized units, imide structures of the formula

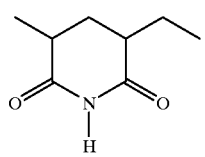

(V)

may also be formed from the last-mentioned monomer. The amount of these structures in the hydrolyzed graft polymer may be from 0 to 60 mol % of the units (V), depending on the amount of polymerized acrylonitrile and on the reaction conditions.

On the other hand, the hydrolysis with bases, in particular metal hydroxides, leads to substantial formation of carboxylate functions.

In order to prevent or substantially inhibit loss of application efficiency of the hydrolyzed graft polymers during storage and in order to obtain a polymer solution having a substantially stable color, antioxidants, reducing agents or aldehyde scavengers may be added during or after the hydrolysis.

Antioxidants, which generally act as free radical scavengers or UV stabilizers, are, for example, secondary aromatic amines, phenol, alkylphenols, thioethers, phosphites or mixtures of compounds of the stated classes of substances. Suitable secondary aromatic amines are, for example, 4,4'-bis(tert-butyl)diphenylamine, 4,4'-bis(phenylmethyl)-diphenylamine and mixtures thereof. Alkylphenols which are suitable as antioxidants are, for example, 2,6-dimethyl-4-tert-butylphenol, 2,4,6-trimethylphenol, 2,4-di-tert-butyl-6-methylphenol and mixtures thereof. Examples of suitable thioethers are dialkyl 3,3'-thiodipropionate, poly-2,3-dimethylphenyl 1,4-disulfide, bis(2-methyl-4-hydroxy-5-tert-butyl) sulfide, dibenzyl sulfide and dialkyl disulfides, eg. dioctadecyl disulfide.

Phosphites which are suitable as antioxidants are, for example, trisnonylphenyl phosphite, di(2,4-di-tert-butylphenyl) pentaerythrityl diphosphite and diphenylene decyl phosphite.

Examples of suitable reducing agents are sodium borohydride, sodium cyanoborohydride and dithionites, such as sodium, potassium or zinc dithionite.

Aldehyde scavengers are, for example, NH-containing compounds, such as urea, ethyleneurea, propyleneurea, melamine, guanidine, phenylbiguanidine and mixtures of the stated compounds. Other aldehyde scavengers are, for example, alkali metal bisulfite such as sodium or potassium bisulfite.

Antioxidants, reducing agents and aldehyde scavengers are each used in amounts of from 0.01 to 20, preferably from 0.1 to 16, % by weight, based on the polymers. These substances may be added before, during or after the hydrolysis of the amido groups contained in the graft polymers.

The graft polymers thus obtained and containing N-vinylcarboxamides and/or vinylamine units are used in papermaking for increasing the dry and wet strength of the paper. The novel graft polymers are preferably used in aqueous solution and are added to the paper stock in an amount of from 0.1 to 10% by weight, based on dry fibers, before sheet formation. The aqueous polymer solution can also be applied to the surface of the paper, the amounts to be used being from 0.1 to 10, preferably from 0.25 to 3, % by weight, based on dry fibers. The aqueous solutions of the polymers are effective in the case of all known paper, board and cardboard qualities, for example in the production of hygiene, writing, printing and packaging papers. The paper, board and cardboard may be produced from a large number of fiber materials, for example from sulfite or sulfate pulp (bleached or unbleached), mechanical pulp, chemothermomechanical pulp (CTMP), thermomechanical pulp (TMP) or waste paper or mixtures of the stated fiber types. The pH of the stock suspension is from 4 to 9, preferably from 6 to 8. The copolymers described above are preferably added to the paper stock suspension in an amount of from 0.25 to 2% by weight, based on dry fibers, prior to sheet formation, and lead to an increase in the dry and wet strength of the paper.

The graft polymers are also suitable as fixing agents for interfering substances and dyes in the production of paper, board and cardboard. For this intended use, the graft polymers are added directly to the paper stock or may be added to the paper stock in the form of a mixture with the rosin size. For example, from 1 to 100, preferably from 5 to 30, parts by weight, based on 100 parts by weight of rosin size, of the graft polymers are used.

Graft polymers which have a high molecular weight, for example K values of from about 150 to 250, are used as retention aids and drainage aids in the production of paper, board and cardboard. For this intended use, from 0.01 to 5, preferably from 0.1 to 2, % by weight, based on the dry fibers, of graft polymers are usually suitable. A further application for the novel graft polymers is their use as starch cationizing agents. Starch can be cationized, for example, by heating an aqueous suspension of starch to 80–180° C. in the presence of the graft polymers. At above the boiling point of the aqueous reaction mixtures, the procedure is carried out in closed pressure-resistant apparatuses. For example, from 0.1 to 100, preferably from 1 to 10, % by weight, based on starch, of graft polymer is used in starch cationization. All types of starch can be cationized with the novel graft polymers, for example natural starch, such as potato, rice, corn and wheat starch, and degraded starches or starch types having amylopectin contents of from at least 95 to 100%, for example pregelatinized corn starches or pregelatinized potato starches Those graft polymers in which the degree of hydrolysis of the polymerized N-vinylcarboxamides is at least 60% are particularly suitable for this intended use. The cationized starches thus prepared are used, for example, in papermaking. They increase the dry and wet strength of the paper and have particularly high retention compared with unmodified starch.

The novel graft polymers can also be used as dispersants for pigments. The amounts usually used for this purpose are from about 0.1 to 5, preferably from 0.5 to 2, % by weight, based on the pigments. Examples of suitable pigments are chalk, clay, talc and titanium dioxide. For use as a filler in papermaking or for the preparation of paper-coating slips, highly concentrated aqueous pigment suspensions are prepared. Such pigment suspensions may contain up to 75% by weight of a pigment.

The novel graft polymers are also suitable as promoters in the diketene sizing of paper, board and cardboard. For this purpose, the graft copolymers are emulsified together with the diketene in the preparation of the diketene emulsions. The diketene emulsions contain, for example, from 0.05 to 5% by weight of a graft polymer. The novel graft polymers ensure rapid development of the diketene size. The graft polymers are also suitable as assistants in the production of tissue papers. For this purpose, they are used in amounts of from 0.05 to 0.5% by weight, based on dry fibers.

In the examples which follow, parts are by weight and percentages are based on the weight of the stocks.

The K values of the polymers were determined according to H. Fikentscher, Cellulose-Chemie, 13 (1932), 58–64 and 71–74, in 1% strength by weight aqueous solution at 25° C.

The paper sheets were produced in a Rapid Kothen laboratory sheet former. The dry tear length was determined according to DIN 53112, page 1, and the wet tear length according to DIN 53112, page 2.

EXAMPLE 1

829.5 g of distilled water, 1.27 g of 75% strength phosphoric acid and 0.87 g of 50% strength sodium hydroxide solution and 33 g of polyethylene glycol having a molecular weight of 1500, introduced into a heatable reactor provided with a stirrer, reflux condenser, thermometer, feed apparatuses, nitrogen inlet and outlet apparatuses, and the pH of the mixture is brought to 6.5 with phosphoric acid or sodium hydroxide solution. The reactor content is then heated to 70° C. in a gentle stream of nitrogen (10 l/h), and 134.7 g of N-vinylformamide are metered in uniformly in the course of 3 hours and a solution of 0.53 g of 2,2'-azobis (2-methylpropionamidine) dihydrochloride in 100 g of distilled water is metered in uniformly in the course of 4 hours. Heating is then continued for a further 2 hours at 70° C. The clear, colorless viscous solution has a solids content of 15.5% and a K value of 79.

Hydrolysis 500 g of the graft polymer solution described above are initially taken in a stirred apparatus having a reflux condenser, a thermometer and a dropping funnel. 103 g of 38% strength hydrochloric acid are added dropwise in the course of 15 minutes with thorough stirring. The reaction mixture is then heated at 70° C. for 6 hours. The conversion is determined by polyelectrolyte titration. The mixture is cooled to room temperature, after which the pH is brought to 3.8 by slow dropwise addition of a total of 77.6 g of 50% strength aqueous sodium hydroxide solution. 11 g of 30% strength sodium bisulfite solution is added to the solution, and stirring is continued for a further 10 minutes. Degree of hydrolysis of the polymerized N-vinylformamide: 91%, solids content: 21.8%, polymer content: 12.2%.

EXAMPLE 2

831 g of distilled water, 0.96 g of aqueous 75% strength phosphoric acid, 0.66 g of 50% strength aqueous sodium hydroxide solution and 66 g of polyethylene glycol having a molecular weight of 1500 are introduced into a reactor according to Example 1 and brought to a pH of 6.5 as in Example 1. The mixture is then heated to 70° C. in a gentle stream of nitrogen (10 l/h), and 101 g of N-vinylformamide are metered in uniformly in the course of 3 hours and a solution of 0.4 g of 2,2'-azobis(2-methylpropionamidine) ihydrochloride in 100 g of distilled water is metered in uniformly in the course of 4 hours at 70° C. Heating is then continued for a further 2 hours at 70° C. The clear, colorless solution has a solids content of 15.1%. The K value of the graft polymer is 62.3.

Hydrolysis 500 g of the graft polymer solution described above are initially taken in a stirred apparatus having a reflux condenser, a thermometer and a dropping funnel. 74.8 g of 38% strength hydrochloric acid are added dropwise in the course of 10 minutes with thorough stirring. The solution is then heated at 70° C. for 6 hours. The conversion is determined by polyelectrolyte titration. After the mixture has cooled to room temperature, the pH is brought to 3.8 by adding 56 g of 50% strength aqueous sodium hydroxide solution a little at a time. 10.6 g of 30% strength sodium bisulfite solution are added, and stirring is continued for a further 10 minutes. 641.4 g of an aqueous solution of a hydrolyzed graft polymer are obtained. The degree of hydrolysis of the polymerized N-vinylformamide is 85%. The solution has a solids content of 20% and a polymer content of 12.5%.

EXAMPLE 3

Example 1 is repeated with the single exception that, instead of the polyethylene glycol having a molecular weight of 1500 which is used there, a polyethylene glycol having a molecular weight of 4000 is now used. A clear, colorless solution having a solids content of 16.4% is obtained. The K value of the polymer is 79.7.

Hydrolysis 500 g of the graft polymer solution described above are hydrolyzed with 108 g of 38% strength hydrochloric acid, as described in Example 1. After the mixture has been cooled, 73.4 g of 50% strength aqueous sodium hydroxide solution are added, with the result that the pH is brought to 3.8. 11.3 g of a 30% strength aqueous sodium bisulfite solution are also added in order to stabilize the graft polymer. The degree of hydrolysis of the polymerized N-vinylformamide is 90%. The resulting reaction solution has a solids content of 22%. The polymer content is 12.9.

EXAMPLE 4

The procedure is as described in Example 1, except that a methylpolyglycol having a molecular weight of 500 is used as the grafting base. A clear, colorless solution having a solids content of 10.4% is obtained. The graft polymer has a K value of 77.6.

Hydrolysis 500 g of the aqueous polymer solution described above are hydrolyzed by adding 102 g of 38% strength hydrochloric acid, as described in Example 1. After the reaction mixture has cooled, 76.9 g of 50% strength aqueous sodium hydroxide solution and 11 g of a 30% strength aqueous sodium bisulfite solution are added to adjust the pH. The solution thus obtained has a solids content of 21.7% and contains 12.1% of polymer. The degree of hydrolysis of the polymerized N-vinylformamide is 94%.

EXAMPLE 5

Example 2 is repeated except that methylpolyglycol having a molecular weight of 500 is used as the grafting base. A clear, colorless polymer solution having a solids content of 15.8% is obtained. The graft polymer has a K value of 70.7.

Hydrolysis 500 g of the polymer solution stated above is treated with 781 g of 38% strength hydrochloric acid by the method stated in Example 1. After the hydrolysis, 58.5 g of 50% strength aqueous sodium hydroxide solution are added to adjust the pH and 11 g of 30% strength sodium bisulfite solution are added for stabilization. The solids content of the solution thus obtained is 20.8% and the polymer content is 13%. 87% of the polymerized N-vinylformamide is hydrolyzed.

EXAMPLE 6

859 g of distilled water, 1.0 g of 75% phosphoric acid, 0.74 g of 50% strength sodium hydroxide solution, 22.3 g of polyethylene glycol having a molecular weight of 1500 and 90.9 g of N-vinylformamide are initially taken in the reactor described in Example 1 and brought to a pH of 6.5. The stirred reaction mixture is heated to 50° C. in a gentle stream of nitrogen, and stirring is continued. A solution of 0.44 g of 2,2'-azobis(2-methylpropionamidine) dihydrochloride in 150 g of water is added in eight portions at regular intervals in the course of 8 hours and the temperature of the reaction mixture is maintained at 50° C. After the addition of the initiator, the reaction mixture is stirred for a further 4 hours at 75° C. The clear, colorless solution thus obtained has a solids content of 10.1%. The K value of the graft polymer is 108.8 (measured in 0.5% strength aqueous solution).

Hydrolysis 500 g of the polymer solution described above are hydrolyzed by the addition of 66.6 g of 38% strength hydrochloric acid, according to the method described in Example 1. After the hydrolysis, 50.2 g of 50% strength aqueous sodium hydroxide solution and 10.1 g of 30% strength sodium bisulfite solution are added. An aqueous solution having a solids content of 15.8% is obtained. The polymer content of the solution is 8.8%. 95% of the polymerized N-vinylformamide is hydrolyzed to vinylamine units.

EXAMPLE 7

Example 6 is repeated with the single exception that a polyethylene glycol having a molecular weight of 4000 is now used as the grafting base. The clear, colorless solution thus obtained has a solids content of 10.1%. The K value of the graft polymer is 107.3.

Hydrolysis 500 g of the aqueous polymer solution is hydrolyzed by the addition of 66.7 g of 38% strength hydrochloric acid by the method described in Example 1. After the reaction mixture has been cooled, 45.8 g of a 50% strength aqueous sodium hydroxide solution and 10.3 g of a 30% strength aqueous sodium bisulfite solution are added. A polymer solution having a solids content of 15.8% is obtained. The polymer content of the solution is 8.8%. 90% of the N-vinylformamide grafted onto polyethylene glycol is hydrolyzed.

EXAMPLE 8

951 g of distilled water, 2.5 g of 75% strength phosphoric acid, 1.95 g of 50% strength aqueous sodium hydroxide solution and 39.2 g of polyethylene glycol having a molecular weight of 1500 are initially taken in the reactor described in Example 1 and the pH is brought to 6.8 as described in Example 1. The solution is then heated to 70° C. in a gentle stream of nitrogen while stirring As soon as 70° C. is reached, 160 g of N-vinylformamide are added uniformly in the course of 3 hours, an aqueous solution of 1.6 g of 2-mercaptoethanol in 50 g of distilled water is added uniformly in the course of 2.75 hours and a solution of 0.64 g of 2,2'-azobis(2-methylpropionamidine) dihydrochloride in 160 g of distilled water is added uniformly in the course of 4 hours, in separate feeds. After the addition of the initiator, the reaction mixture is stirred for a further 2 hours at 70° C. A clear, colorless polymer solution having a solids content of 14.9% is obtained. The graft polymer has a K value of 50.8 (measured in 1% strength aqueous solution).

Hydrolysis 98.3 g of 38% strength hydrochloric acid are added to 500 g of the aqueous polymer solution described above, by the method described in Example 1. After the hydrolysis, 68.5 g of a 50% strength aqueous sodium hydroxide solution and 11.2 g of 30% strength sodium bisulfite solution are added to the reaction mixture. An aqueous solution having a solids content of 21.7% and a polymer content of 11.9% is obtained. 86% of the N-vinylformamide grafted on is hydrolyzed.

EXAMPLE 9

The procedure is as stated in Example 8, but polyethylene glycol having a number average molecular weight of 4000 is used as the grafting base. The solids content of the clear, colorless polymer solution is 15.9%. The graft polymer has a K value of 56.1, measured in 1% strength aqueous solution.

Hydrolysis 102.2 g of 38% strength hydrochloric acid are added to 500 g of the aqueous polymer solution described above, by the method described in Example 1. After the reaction mixture has cooled, 70.5 g of a 50% strength aqueous sodium hydroxide solution and 11.1 g of a 30% strength sodium bisulfite solution are added. An aqueous solution having a solids content of 22.4% results. The polymer content of the solution is 12.3%. 93% of the N-vinylformamide grafted onto polyethylene glycol is hydrolyzed.

EXAMPLE 10

951 g of distilled water, 2.5 g of 75% strength phosphoric acid, 1.95 g of 50% strength aqueous sodium hydroxide solution and 78.4 g of polyethylene glycol having a number average molecular weight of 1500 are initially taken in the re actor described in Example 1 and brought to a pH of 6.5. The solution is heated to 70° C. in a gentle stream of nitrogen. As soon as this temperature is reached, 120 g of so vinylformamide are added uniformly in the course of 3 hours, a solution o f 1.2 g of 2-mercaptoethanol in 50 g of distilled water is added uniformly i n the course of 2.75 hours and a solution of 0.48 g of 2,2'-azobis(2-methylpropionamidine) dihydrochloride in 100 g of distilled water is added uniformly in the course of 4 hours, in separate streams. After the end of the initiator addition, the reaction mixture is stirred for a further 2 hours at 70° C. The clear, colorless polymer solution thus obtained has a solids content of 14%. The K value of the graft polymer is 44.4.

Hydrolysis 500 g of the aqueous polymer solution described above are hydrolyzed by the addition of 69.2 g of 38% strength hydrochloric acid, according to the method stated in Example 1. After the hydrolysis, 47.7 g of a 50% strength aqueous sodium hydroxide solution and 10.3 g of a 30% strength sodium bisulfite solution are added. The aqueous solution obtained has a solids content of 19.6% and a polymer content of 11.8%. 83% of the NE vinylformamide grafted onto polyethyleneglycol is hydrolyzed.

EXAMPLE 11

859 g of distilled water, 1.08 g of 75% strength phosphoric acid, 0.74 g of 50% strength aqueous sodium hydroxide solution, 44.6 g of polyethylene glycol having a molecular weight of 1500 and 68.2 g of N-vinylformamide are initially taken in the reactor described in Example 1 and brought to a pH of 6.8. The reaction mixture is then heated to 50° C. in a gentle stream of nitrogen. As soon as the temperature has been reached, a solution of 0.33 g of 2,2'-azobis(2-methylpropionamidine) dihydrochloride in 150 g of distilled water is added in 8 portions at regular intervals in the course of 8 hours. A solution of 0.07 g of 2,2'-azobis(2- methylpropionamidine) dihydrochloride in 75 g of distilled water is then added all at once, and the stirred reaction mixture is heated at 75° C. for a further 4 hours. The clear, colorless solution thus obtained has a solids content of 10.1%. The K value of the polymers is 91 (measured in 1% strength aqueous solution).

Hydrolysis 500 g of the polymer solution described above are hydrolyzed by the addition of 49.9 g of 38% strength hydrochloric acid according to the method stated in Example 1. After the hydrolysis, 37.1 g of a 50% strength aqueous sodium hydroxide solution and 9.6 g of a 30% strength sodium bisulfite solution are added. A solution having a solids content of 15.7% results. The polymer content of the solution is 9%. 91% of the N-vinylformamide grafted on is hydrolyzed.

EXAMPLE 12

Steam distillation apparatus is additionally attached to the reactor described in Example 1. 550 g of methanol, 401 g of distilled water, 2.5 g of 75% strength aqueous phosphoric acid, 1.95 g of 50% strength aqueous sodium hydroxide solution and 39.2 g of polypropylene glycol having a molecular weight of 2000 are initially taken therein and the pH of the aqueous solution is brought to 6.5. The stirred mixture is heated to 70° C. in a gentle stream of nitrogen. As soon as this temperature is reached, 160 g of N-vinylformamide are added uniformly in the course of 3 hours, a solution of 1.6 g of 2-mercaptoethanol in 50 g of distilled water is added separately from this and uniformly in the course of 2.7 hours and a solution of 0.64 g of 2,2'-azobis(2-methylpropionamidine) dihydrochloride is added separately from this and uniformly in the course of 4 hours. After the addition of the initiator, the reaction mixture is stirred for a further 2 hours at 70° C. Steam is then passed into the reaction mixture until the internal temperature is 100° C. The methanol is distilled off in this way. A white dispersion having a solids content of 20.1% results.

Hydrolysis 500 g of the dispersion described above are mixed with 132.7 g of 38% strength hydrochloric acid and hydrolyzed by the method stated in Example 1. 97.6 g of a 50% strength aqueous sodium hydroxide solution and 11.9 g of a 30% strength aqueous sodium bisulfite solution are then added. An aqueous solution having a solids content of 25.9% is obtained. The polymer content of the solution is 14.7%. 89% of the N-vinylformamide grafted on is hydrolyzed.

EXAMPLE 13

829 g of distilled water, 1.27 g of 75% strength phosphoric acid, 0.87 g of 50% strength aqueous sodium hydroxide solution and 49.5 g of the reaction product of 1 mol of a $C_{13}$ oxo alcohol with 20 mol of ethylene oxide are initially taken in the reactor described in Example 1. The pH of the aqueous solution is brought to 6.7. The stirred reactor content is heated to 70° C. in a gentle stream of nitrogen, and 117.9 g of N-vinylformamide are metered in at this temperature in the course of 3 hours and, separately from this, a solution of 0.46 g of 2,2'-azobis(2-methyl-propionamidine) dihydrochloride is metered in over 4 hours. After the addition of the initiator, the reaction mixture is stirred for a further 2 hours at 70° C. A very cloudy solution having a solids content of 15% is formed.

Hydrolysis 500 g of the solution described above are hydrolyzed by the addition of 86.7 g of 38% strength hydrochloric acid according to the method stated in Example 1. After cooling, 60.1 g of 50% strength aqueous sodium hydroxide solution and 8.1 g of a 30% strength sodium bisulfite solution are added. An aqueous solution having a solids content of 19.9% results. The polymer content of the solution is 12.2%. 80% of the N-vinylformamide grafted on is hydrolyzed.

EXAMPLE 14

829 g of distilled water, 1.27 g of 75% strength aqueous phosphoric acid, 0.87 g of 50% strength aqueous sodium hydroxide solution, 0.25 g of polyvinylpyrrolidone having a K value of 90 and 66 g of polyethylene glycol having a molecular weight of 1500 are initially taken in the reactor described in Example 1, brought to a pH of 6.7 and heated to 70° C. under a gentle stream of nitrogen while stirring. As soon as the reactor content has reached this temperature, a mixture of 50.5 g of N-vinylformamide and 49.5 g of acrylonitrile is metered in uniformly in the course of 2 hours and, separately from this, a solution of 0.4 g of 2,2'-azobis (2-methylpropionamidine) dihydrochloride in 100 g of distilled water is metered in uniformly in the course of 4 hours. A coarse 15% strength suspension of the graft polymer is obtained.

Hydrolysis 500 g of the polymer suspension described above are initially taken in an apparatus equipped with a stirrer, and 37.4 g of 38% strength hydrochloric acid are added in the course of 10 minutes. The suspension is stirred for 8 hours at 70° C. The reaction mixture is then allowed to cool and the pH is brought to 3.0 by adding 83.0 g of 25% strength aqueous sodium hydroxide solution. 9.3 g of a 30% strength aqueous sodium bisulfite solution are then also added, and the reaction mixture is stirred for a further 15 minutes. It has a solids content of 16.9% and a polymer content of 12.4%. The degree of hydrolysis of the polymerized N-vinylformamide is 90%.

EXAMPLE 15

395 g of distilled water, 2.62 g of 75% strength aqueous phosphoric acid, 1.8 g of 50% strength aqueous sodium hydroxide solution, 1.44 g of an aqueous solution of the sodium salt of a molar copolymer of maleic acid and styrene, having a molecular weight of 150,000, and 75.6 g of olyethylene glycol having a molecular weight of 1500 are initially taken in the reactor described in Example 1 and brought to a pH of 6.5. The stirred mixture is then heated to 65° C. in a gentle stream of nitrogen and, at this temperature, 34 g of vinyl acetate are added uniformly in the course of 2 hours, separately from this 81 g of N-vinylformamide are added uniformly in the course of 3 hours and, likewise separately from this, a solution of 0.25 g of 2,2'-azobis(2-methylpropionamidine) dihydro-chloride is added uniformly in the course of 4 hours. During the polymerization, the reaction mixture becomes highly viscous. It is therefore diluted with 300 g of distilled water. After the addition of the initiator, the reaction mixture is stirred for a further 2 hours at 65° C., after which a solution of 0.05% of 2,2'-azobis(2-methyl-propionamidine) dihydrochloride in 1 g of distilled water is added all at once. The temperature of the reaction mixture is then increased to 98° C. in the course of 4 hours and the reaction solution is then cooled. A clear, colorless solution having a solids content of 18.9% is obtained. The polymer has a K value of 67.0.

Hydrolysis 500 g of the polymer solution described above are hydrolyzed by the addition of 65.4 g of 38% strength hydrochloric acid according to the method stated in Example 1. After the hydrolysis, 45.2 g of a 50% strength aqueous sodium hydroxide solution and 7.5 g of a 30% strength aqueous sodium bisulfite solution are added. The reaction mixture has a solids content of 22% and a polymer content of 15.5%. The degree of hydrolysis of the polymerized N-vinylformamide is 95% and that of the polymerized vinyl acetate is 35%.

EXAMPLE 16

550 g of methanol, 401 g of distilled water, 2.5 g of 75% strength phosphoric acid, 1.95 g of 50% strength aqueous sodium hydroxide solution and 39.2 g of polytetrahydrofuran having a molecular weight of 650 are initially taken in the apparatus described in Example 12 and the pH of the solution is brought to 6.5. The stirred solution is then heated to 70° C. in a gentle stream of nitrogen. As soon as this temperature is reached, 160 g of N-vinylformamide is metered in uniformly in the course of 3 hours and, separately from this, a solution of 0.64 g of 2,2'-azobis(2-methylpropionamidine) dihydrochloride in 150 g of distilled water is metered in uniformly in the course of 4 hours. The reaction mixture is then stirred for a further 2 hours at 70° C. Steam is then passed in until the internal temperature is 100° C., in order to distill off the methanol.

The white dispersion thus obtained has a solids content of 19.2%.
Hydrolysis 500 g of the dispersion described above are hydrolyzed by the addition of 126.0 g of 38% strength hydrochloric acid according to the method stated in Example 1. After the hydrolysis, 85.6 g of 50% strength aqueous sodium hydroxide solution and 11.8 g of 30% strength sodium bisulfite solution are added. A dispersion having a solids content of 24.4% results. The polymer content is 14.4%. The N-vinylformamide grafted on has a degree of hydrolysis of 88%.

EXAMPLE 17

829 g of distilled water, 1.27 g of 75% strength phosphoric acid, 0.87 g of 50% strength aqueous sodium hydroxide solution and 33 g of polypropylene glycol having a molecular weight of 600 are initially taken in the reactor described in Example 1 and brought to a pH of 6.7. The stirred solution is heated to 70° C. in a gentle stream of nitrogen. At this temperature, 134.6 g of N-vinylformamide are added uniformly in the course of 3 hours and, separately from this, 0.53 g of 2,2'-azobis(2-methylpropionamidine) dihydrochloride dissolved in 100 g of distilled water is added uniformly in the course of 4 hours. After the addition of the initiator, the reaction mixture is stirred for a further 2 hours at 70° C. A virtually clear, colorless solution having a solids content of 15.3% results.
Hydrolysis 500 g of the solution described above are hydrolyzed by the addition of 109 g of 38% hydrochloric acid according to the method stated in Example 1. After the hydrolysis, 68.7 g of 50% strength aqueous sodium hydroxide solution and 11.1 g of 30% strength sodium bisulfite solution are added. A solution having a solids content of 20.9% and a polymer content of 12.2% results. The degree of hydrolysis of the N-vinylformamide grafted on is 92%.

EXAMPLE 18

829 g of distilled water, 1.27 g of 75% strength phosphoric acid, 0.87 g of 50% strength aqueous sodium hydroxide solution and 66.5 g of polypropylene glycol having a molecular weight of 600 are initially taken in the reactor described in Example 1 and brought to a pH of 6.7. The stirred solution is heated to 70° C. in a gentle stream of nitrogen. As soon as this temperature is reached, 101 g of N-vinylformamide are metered in uniformly in the course of 3 hours and, separately from this, a solution of 0.3 g of 2,2'-azobis(2-methylpropionamidine) dihydrochloride in 100 g of distilled water is metered in uniformly in the course of 4 hours. A solution of 0.1 g of 2,2'-azobis(2-methylpropion-amidine) dihydrochloride in 10 g of distilled water is then added to the reaction mixture and heating is continued for a further 2 hours at 70° C. A colorless, slightly cloudy solution having a solids content of 14.8% is obtained.
Hydrolysis 500 g of the solution described above are hydrolyzed by the addition of 73.1 g of 33% strength hydrochloric acid according to the method stated in Example 1. After the hydrolysis, 51.0 g of 50% strength aqueous sodium hydroxide solution and 10.5 g of 30% strength sodium bisulfite solution are added. A solution having a solids content of 19.8% and a polymer content of 12.4% results. The degree of hydrolysis of the N-vinylformamide grafted on is 89%.

Comparative Examples

Polymer 1

74 g of 38% strength hydrochloric acid (120 mol %, based on N-vinylformamide) are added dropwise to 300 g of a 15.3% strength aqueous polyvinylformamide solution (K value of the polymer is 85). The mixture is then heated for about 5 hours at 70° C. The degree of hydrolysis (>93%) is monitored by polyelectrolyte titration. After cooling, the pH of the solution is increased to 3.5 using 50% strength sodium hydroxide solution (40.6 g). The polymer content of the solution is 10.9% by weight.
Polymer 2

32 g of potato starch are mixed with 500 g of 15% strength aqueous polyvinylformamide solution (K value 85). After the starch has been completely mixed in, 121 g (120 mol %, based on N-vinylformamide) of 38% strength hydrochloric acid are added dropwise in the course of 10 minutes, stirring is then continued for a further 15 minutes at room temperature and the mixture is finally heated at 70° C. for 6 hours. The end point (degree of hydrolysis 95%) of the reaction is determined by polyelectrolyte titration. A clear brownish solution which contains 16.4% by weight of active ingredient and, according to EP-A-0 301 372 is used as a dry and wet strength agent for paper is obtained.
Polymer 3

A copolymer of 70% by weight N-vinylformamide and 30% by weight of vinyl acetate, having a K value of 85, is prepared according to U.S. Pat. No. 4 978 427 and hydrolyzed by the addition of 110 mol of a 38% strength hydrochloric acid per mole of N-vinylformamide content of the polymer until at least 90% of the polymerized N-vinylformamide and at least 80% of the polymerized vinyl acetate have been hydrolyzed.

Use Examples

EXAMPLE 19

Sheets having a basis weight of 80 g/m$^2$ were produced in a Rapid-Köthen sheet former. The paper stock consisted of 50% of bleached hardwood sulfite pulp and 50% of bleached softwood sulfite pulp having a freeness of 32° SR (Schopper-Riegler) in 0.5% strength aqueous suspension. The pH of the stock suspension was 7.0. The stock suspension was divided into 22 equal parts. The substances stated under (b) to (v) were added to 21 samples:

(a) The stock suspension contained no further additives.

(b) 1%, based on dry fibers, of an aqueous solution of a commercial neutral wet strength resin based on a reaction product of epichlorohydrin and a polyamidoamine obtained from diethylenetriamine and adipic acid was added to the stock suspension.

(c) 1%, based on dry fibers, of an aqueous solution of a polyvinylamine hydrochloride having a K value of 85, according to Comparative Example 1, was added to the stock suspension.

(d) 1%, based on dry fibers, of an aqueous polymer solution according to Comparative Example 2 was added to the stock suspension.

(e) to (v) 1%, based on dry fibers, of the hydrolyzed graft polymers according to Examples 1 to 18 was added to each of the stock suspensions.

The pulps obtained were then drained on a Rapid-Köthen sheet former to give sheets having a basis weight of 80 g/m². The dry and wet tear lengths stated in Table 1 were measured for the above mentioned polymers.

TABLE 1

| Additive | | Wet tear length [m] unaged | Wet tear length [m] aged* | Dry tear length [m] |
|---|---|---|---|---|
| a) | without polymer | 116 | 121 | 2376 |
| b) | comparison | 68 | 837 | 2910 |
| c) | " | 754 | 812 | 2932 |
| d) | " | | 449 | 2456 |
| e) | according to the invention | 753 | 804 | 3640 |
| f) | according to the invention | 652 | 675 | 3883 |
| g) | according to the invention | 685 | 724 | 3936 |
| h) | according to the invention | 765 | 845 | 3715 |
| i) | according to the invention | 695 | 772 | 3687 |
| j) | according to the invention | 840 | 858 | 3944 |
| k) | according to the invention | 813 | 843 | 4068 |
| l) | according to the invention | 662 | 697 | 3720 |
| m) | according to the invention | 684 | 665 | 3886 |
| n) | according to the invention | 562 | 622 | 3753 |
| o) | according to the invention | 687 | 742 | 3246 |
| p) | according to the invention | 682 | 693 | 3709 |
| q) | according to the invention | 801 | 799 | 3681 |
| r) | according to the invention | 576 | 552 | 3446 |

TABLE 1-continued

| Additive | | Wet tear length [m] unaged | Wet tear length [m] aged* | Dry tear length [m] |
|---|---|---|---|---|
| s) | according to the invention | 650 | 628 | 3717 |
| t) | according to the invention | 707 | 739 | 3816 |
| u) | according to the invention | 660 | 677 | 3808 |
| v) | according to the invention | 689 | 752 | 3864 |

*5 min at 110° C.

EXAMPLE 20

Sheets having a basis weight of 80 g/m² were produced in a Rapid-Köthen sheet former. The paper stock consisted of 50% of bleached hardwood sulfite pulp and 50% of bleached softwood sulfite pulp having a freeness of 32° SR (Schopper-Riegler) in 0.5% strength aqueous suspension. The pH of the stock suspension was 4.5. The stock suspension was divided into 21 equal parts. The substances stated under (d) to (v) were added to 20 samples:

(a) The stock suspension contained no further additives.

(b) 1%, based on dry fibers, of an aqueous solution of a commercial wet strength resin based on a reaction product of urea/melamine with formaldehyde was added to the stock suspension.

(c) 1%, based on dry fibers, of an aqueous solution of a copolymer of vinylamine hydrochloride and vinyl alcohol, according to Comparative Example 3, was added to the is stock suspension.

(d) to (u) 1%, based on dry fibers, of the hydrolyzed graft polymers which were obtained according to Examples 1 to 18 was added to each of the stock suspensions, the hydrolyzed graft polymer according to Example 1 being used in the case of (d) and the hydrolyzed graft polymer prepared according to Example 18 being used in the case of (u).

The pulps obtained were then drained on a Rapid-Köthen sheet former to give sheets having a basis weight of 80 g/m². The dry and wet tear lengths stated in Table 2 were measured for the above mentioned polymers.

TABLE 2

| Additive | | Wet tear length [m] unaged | Wet tear length [m] aged* | Dry tear length [m] |
|---|---|---|---|---|
| a) | without addition | 149 | 170 | 2376 |
| b) | comparison | 531 | 645 | 3710 |
| c) | " | 599 | 607 | 4089 |
| d) | according to the invention | 607 | 698 | 4562 |
| e) | according to the invention | 606 | 596 | 3913 |
| f) | according to the | 649 | 655 | 3543 |

TABLE 2-continued

| Additive | | Wet tear length [m] unaged | Wet tear length [m] aged* | Dry tear length [m] |
|---|---|---|---|---|
| g) | according to the invention | 558 | 620 | 3819 |
| h) | according to the invention | 441 | 601 | 3965 |
| i) | according to the invention | 533 | 657 | 4183 |
| j) | according to the invention | 585 | 613 | 3924 |
| k) | according to the invention | 430 | 488 | 3736 |
| l) | according to the invention | 479 | 500 | 3189 |
| m) | according to the invention | 433 | 468 | 3655 |
| n) | according to the invention | 529 | 564 | 3652 |
| o) | according to the invention | 507 | 547 | 4554 |
| p) | according to the invention | 614 | 597 | 4453 |
| q) | according to the invention | 675 | 835 | 4826 |
| r) | according to the invention | 596 | 625 | 3600 |
| s) | according to the invention | 559 | 558 | 3565 |
| t) | according to the invention | 585 | 566 | 3362 |
| u) | according to the invention | 615 | 571 | 3746 |

*5 min at 110° C.

We claim:

1. A graft polymer comprising (1) at least one polymer containing alkylene oxide units and (2) at least one polymerized ethylenically unsaturated compound, wherein the graft polymer is obtained by free radical polymerizing
(A) a monomer or monomer mixture comprising:
  (a) from 10–100% by weight of a N-vinylcarboxamide of the formula:

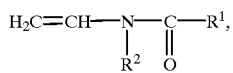

where $R^1$ and $R^2$ are each H or $C_1$–$C_6$-alkyl,
  (b) from 0–90% by weight of at least one other monoethylenically unsaturated monomer which is copolymerizable with (a), and
  (c) from 0–5% by weight of at least one monomer having at least two ethylenically unsaturated nonconjugated double bonds in the molecule, in the presence of (B) a material selected from the group consisting of a polytetrahydrofuran and a polymer which contains at least 3 units of a $C_2$–$C_4$ alkylene oxide and is a homopolymer of $C_{2-4}$-alkylene oxide having two free terminal OH groups or random or block copolymers of $C_{2-4}$-alkylene oxides having two free terminal OH groups or the reaction products of $C_{2-4}$-alkylene oxides with phenols, amines or fatty carboxylic acids, in a weight ratio (A):(B) ranging from 95:5 to 10:80, followed by eliminating some or all of the groups

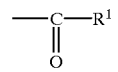

from the polymerized monomers (a) in the graft polymer to form units of the formula

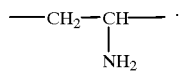

2. A graft polymer as claimed in claim 1, wherein (A) comprises N-vinylformamide, and from 2 to 100% of the formyl groups of the polymerized N-vinylformamide are eliminated from the graft polymer to form units of the formula

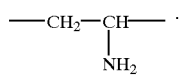

3. A graft polymer as claimed in claim 1, wherein
(A) comprises:
  (a) from 10 to 99% by weight of N-vinylformamide, and
  (b) from 1 to 90% by weight of vinyl formate or vinyl acetate, from 1 to 100% of formyl groups of the polymerized N-vinylformamide are eliminated from the graft polymer to form units of the formula

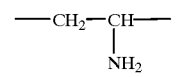

and from 2 to 100% of the formate or acetate groups of the polymerized vinyl formate or vinyl acetate are eliminated from the graft polymer to form units of the formula

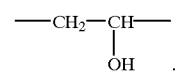

4. A graft polymer as claimed in claim 2, wherein from 30 to 95% of the formyl groups are eliminated from the graft polymer.

5. A graft polymer as claimed in claim 3, wherein from 30 to 95% of the formyl groups and from 30 to 95% of the formate or acetate groups are eliminated from the graft polymer.

6. A process for the production of paper, board or cardboard, comprising combining a graft polymer as claimed in claim 1 with a paper stock, followed by draining the paper stock on a wire to form sheets.

7. A graft polymer as claimed in claim 1, wherein said weight ratio of (A):(B) is 95:5 to 10:50.

8. A process for the preparation of a graft polymer comprising (1) at least one polymer containing alkylene oxide units and (2) at least one polymerized ethylenically unsaturated compound, comprising free radically polymerizing (A) a monomer or monomer mixture comprising:
(a) from 10–100% by weight of a N-vinylcarboxamide of the formula

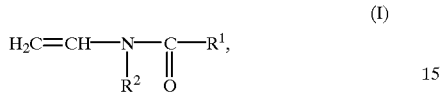
(I)

where $R^1$ and $R^2$ are each H or $C_1$–$C_6$-alkyl,
(b) from 0–90% by weight of at least one other monoethylenically unsaturated monomer which is copolymerizable with (a), and
(c) from 0–50% by weight of at least one other monoethylenically unsaturated, ethylenically unsaturated, nonconjugated double bonds in the molecule, in the presence of (B) a material selected from the group consisting of a polytetrahydrofuran and a polymer which contains at least 3 units of a $C_2$–$C_4$ alkylene oxide and is a homopolymer of $C_{2-4}$-alkylene oxide having two free terminal OH groups or random or block copolymers of $C_{2-4}$-alkylene oxides having two free terminal OH groups or the reaction products of $C_{2-4}$-alkylene oxides with phenols, amines or fatty carboxylic acids, in a weight ratio (A):(B) ranging from 95:5 to 10:80, followed by eliminating some or all of the groups

from the polymerized monomers (a) in the graft polymer to form units of the formula

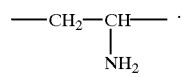

9. A process for the preparation of a graft polymer as claimed in claim 8, wherein
(A) comprises N-vinylformamide, and from 1 to 100% of the formyl groups of the polymerized N-vinylformamide are eliminated in the graft polymer to form units of the formula

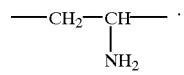

10. A process for the preparation of a graft polymer as claimed in claim 8, wherein
(A) comprises:
(a) from 10 to 99% by weight of N-vinylformamide, and
(b) from 90 to 1% by weight of vinylformate or vinyl acetate,
from 1 to 100% of the formyl groups of the polymerized N-vinylformamide are eliminated from the graft polymer to form units of the formula

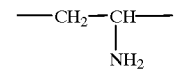

and from 2 to 100% of the formate or acetate groups of the polymerized vinyl formate or vinyl acetate are eliminated from the graft polymer to form units of the formula

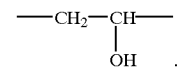

\* \* \* \* \*